United States Patent
Rogers et al.

(10) Patent No.: US 8,442,876 B1
(45) Date of Patent: May 14, 2013

(54) RETURNABLE CONTAINER MANAGEMENT AND REPAIR SYSTEM AND METHOD

(75) Inventors: Carla Rogers, Dillon, SC (US); Ken Parker, Florence, SC (US); Steve Jewell, Hartsville, SC (US); Matthew Milligan, Cades, SC (US)

(73) Assignees: Honda Motor Co., Ltd., Tokyo (JP); Midwest Express Inc., East Liberty, OH (US)

( * ) Notice: Subject to any disclaimer, the term of this patent is extended or adjusted under 35 U.S.C. 154(b) by 1032 days.

(21) Appl. No.: 12/272,568

(22) Filed: Nov. 17, 2008

(51) Int. Cl.
*G06Q 10/00* (2012.01)

(52) U.S. Cl.
USPC .............................................. 705/28; 705/1.1

(58) Field of Classification Search .................. None
See application file for complete search history.

(56) References Cited

U.S. PATENT DOCUMENTS

| | | | | |
|---|---|---|---|---|
| 3,734,308 A * | 5/1973 | Pasternack | | 410/80 |
| 3,823,837 A * | 7/1974 | Wennberg | | 414/325 |
| 4,286,007 A * | 8/1981 | Oellerking | | 428/194 |
| 4,785,957 A * | 11/1988 | Beck et al. | | 220/4.28 |
| 5,585,917 A | 12/1996 | Woite et al. | | |
| 5,828,969 A * | 10/1998 | Chamney et al. | | 702/35 |
| 6,148,291 A | 11/2000 | Radican | | |
| 6,520,544 B1 | 2/2003 | Mitchell et al. | | |
| 6,616,055 B2 | 9/2003 | Okamura et al. | | |
| 6,785,582 B2 * | 8/2004 | Araujo | | 700/106 |
| 7,136,832 B2 | 11/2006 | Li et al. | | |
| 7,277,866 B1 | 10/2007 | Or-Bach et al. | | |
| 7,388,492 B2 | 6/2008 | Watanabe | | |
| 7,945,478 B2 * | 5/2011 | Hogan et al. | | 705/20 |
| 2002/0035417 A1 * | 3/2002 | Badger et al. | | 701/19 |
| 2002/0069141 A1 | 6/2002 | Kawamura et al. | | |
| 2002/0156768 A1 * | 10/2002 | Ohta | | 707/1 |
| 2002/0161878 A1 | 10/2002 | Okamura et al. | | |
| 2003/0225788 A1 | 12/2003 | Kawakami et al. | | |
| 2004/0031793 A1 * | 2/2004 | Garcia | | 220/1.5 |
| 2004/0153209 A1 | 8/2004 | Muller | | |
| 2004/0167832 A1 * | 8/2004 | Wille | | 705/28 |
| 2008/0040246 A1 * | 2/2008 | Fukamachi | | 705/29 |
| 2008/0115465 A1 | 5/2008 | Dickinson | | |
| 2008/0272183 A1 * | 11/2008 | Dumas | | 229/206 |
| 2009/0007525 A1 | 1/2009 | Lewis et al. | | |
| 2010/0063887 A1 * | 3/2010 | Kranz et al. | | 705/17 |

* cited by examiner

*Primary Examiner* — Asfand Sheikh
(74) *Attorney, Agent, or Firm* — Standley Law Group LLP

(57) ABSTRACT

A computerized system and method for managing a returnable container inventory and repairs of the returnable containers. The computerized system and method has features and functionality for tracking and managing repairs of special returnable containers that comprise multiple parts. The computerized system and method supports tracking of containers through a distribution network and management of data related to repairs performed on returnable containers as well as the spare parts that are used to repair the containers. Special handling features support removal of the containers from the distribution network for a variety of reasons. Report features allow a shipper to determine the status of containers throughout the distribution network, to view data related to the container and spare parts inventory, and to manage the container inventory using data collection and analysis features.

20 Claims, 8 Drawing Sheets

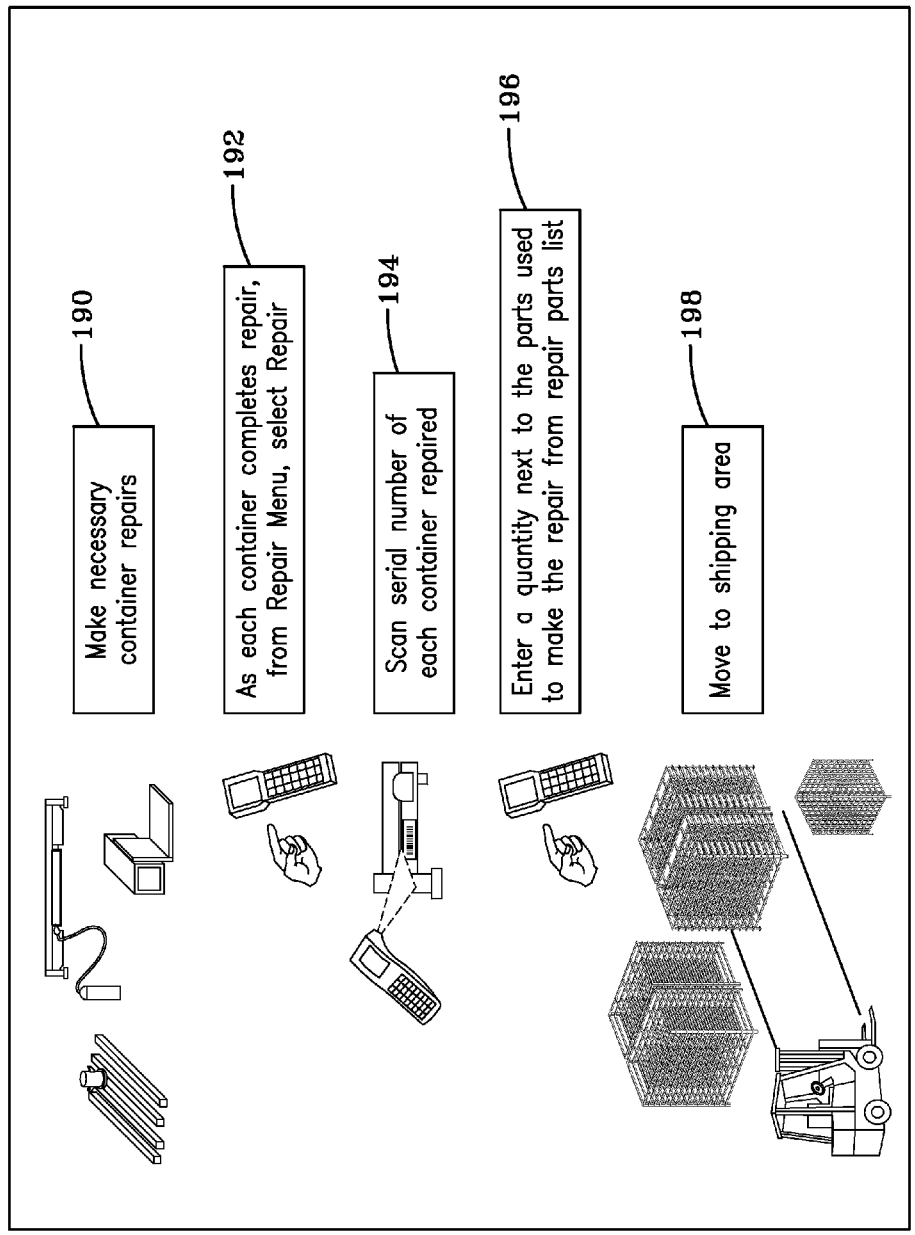

|  |  | Apr-08 | May-08 | Jun-08 | Jul-08 | Aug-08 | Sep-08 | Oct-08 | SUMMARY PA PB Nov-08 |
|---|---|---|---|---|---|---|---|---|---|
| TA | Total Received* | 2,000 | 1,500 | 3,000 | 3,000 | 3,008 | 1,800 | 1,600 | 2,500 |
| TA | Shipped | 2,500 | 4,000 | 2,800 | 3,200 | 3,600 | 2,500 | 1,800 | 1,250 |
| TA | E-O-M Balance | 15,145 | 12,645 | 12,845 | 12,645 | 12,053 | 11,353 | 11,153 | 12,403 |
| TA | Total Damaged Received | 300 | 300 | 250 | 100 | 150 | 100 | 50 | 100 |
| TA | Total Repaired | 100 | 0 | 0 | 0 | 50 | 0 | 0 | 0 |
| TB | Total Received* | 9,000 | 12,000 | 10,000 | 9,000 | 11,000 | 10,000 | 9,000 | 8,000 |
| TB | Shipped | 12,000 | 13,000 | 12,000 | 15,000 | 16,000 | 12,000 | 11,000 | 8,000 |
| TB | E-O-M Balance | 31,134 | 30,134 | 28,134 | 22,134 | 17,134 | 15,134 | 13,134 | 13,134 |
| TB | Total Damaged Received | 50 | 50 | 50 | 50 | 100 | 50 | 75 | 100 |
| TB | Total Repaired | 50 | 100 | 0 | 0 | 0 | 0 | 100 | 100 |
| PA | Total Received* | 10 | 10 | 50 | 50 | 60 | 60 | 50 | 4 |
| PA | Shipped | 240 | 240 | 300 | 224 | 224 | 224 | 224 | 224 |
| PA | E-O-M Balance | 5,771 | 5,541 | 5,291 | 5,117 | 4,953 | 4,789 | 4,615 | 4,395 |
| PA | Total Damaged Received | 20 | 50 | 20 | 20 | 30 | 20 | 0 | 0 |
| PA | Total Repaired | 0 | 0 | 80 | 0 | 0 | 0 | 0 | 0 |
| PB | Total Received from WHSE | 0 | 0 | 0 | 50 | 50 | 50 | 30 | 10 |
| PB | Total Received from WM | 112 | 360 | 112 | 224 | 240 | 240 | 240 | 240 |
| PB | Shipped | 112 | 56 | 112 | 240 | 168 | 168 | 240 | 240 |
| PB | E-O-M Balance | 0 | 304 | 384 | 418 | 540 | 662 | 692 | 702 |
| PB | Total Damaged Received | 2 | 3 | 5 | 0 | 0 | 10 | 0 | 5 |
| PB | Total Repaired | 0 | 0 | 5 | 0 | 0 | 10 | 0 | 5 |
| 208 | Total Received for the Month | 11,010 | 13,510 | 13,130 | 12,100 | 14,118 | 11,910 | 10,680 | 10,514 |

FIG-8

RETURNABLE CONTAINER MANAGEMENT AND REPAIR SYSTEM AND METHOD

CROSS-REFERENCE TO RELATED APPLICATIONS

None.

FIELD OF THE INVENTION

The present invention relates generally to systems and methods for managing returnable containers. In particular, the present invention relates to a computerized system and method for managing returnable containers and repairs of returnable containers.

BACKGROUND OF THE INVENTION

Many shippers use returnable or reusable containers to facilitate the distribution of their products to retailers and dealers. The containers are used to transport products from a shipper's facility to retailers and dealers. Once the full containers that have been received at the retailers or dealers are unloaded, they are transported back to the shipper's facility where they are prepared for use in shipping additional products. The shipper loads the containers with additional products and the containers are again shipped to the retailers and dealers.

Many different types of containers have been developed to accommodate various products that are shipped in reusable containers. A variety of general purpose containers are suitable for many applications. For example, small, rectangular totes made of a durable material may be used to transport many different types of small products or parts. Such containers are "generic" and may be used interchangeably to meet a variety of requirements and needs.

Other products may require large containers that are customized to accommodate the products that are loaded into the containers. The containers may be designed to meet a variety of requirements and needs that cannot be met with the use of multi-purpose containers. First, the containers may be designed to conform to the outline or footprint of the product to facilitate loading of the container and to minimize movement of the product while in the container. In addition, the containers may be designed to protect the product during transport, to facilitate movement of the product while at the shipper's or dealer's facility as well as to or from a truck or trailer, and to minimize the possibility of injury to individuals loading, unloading, and transporting the containers and products.

One type of product that is typically transported in a specialized container is a personal recreational vehicle (PRV) (e.g., an all-terrain vehicle (ATV) or personal watercraft (PWC)). PRVs typically have exposed upholstery, gauges, and other components or parts that are susceptible to damage and degradation if left exposed to weather, road, or other hazards. As a result, it is important to protect the vehicles during transport. One type of specialized container that has been developed for transportation of PRVs is comprised of multiple components including a base, top, and other components for securing the PRV within the container while it is transported. The use of multiple components allows the container to be assembled and dissembled around the product while providing the needed protection during transport.

Although specialized returnable containers allow a shipper to meet many needs related to the transport of products from a shipping facility to retailers or dealers, they are typically more expensive to manufacture and maintain than general purpose containers. They may have unusual shapes or sizes to accommodate the specific products to be contained, and therefore, may be more costly to manufacture and transport. If they are comprised of multiple components, additional expense may be incurred in shipping and maintaining the additional components as well as tracking the additional components along with the containers.

For a variety of reasons, special containers are costly for a shipper to purchase and maintain. Therefore, shippers are interested in purchasing and maintaining only the number of containers they need to support their distribution network. To manage costs, they are interested in keeping containers they purchase in service as long as possible. For special containers—especially those that have multiple parts—keeping them in service requires frequent inspection, and in some cases repairs. For shippers that require a large volume of containers to support their distribution network, container maintenance can require a substantial amount of resources. The shipper must maintain spare parts for the containers as well as repair equipment that is used to complete repairs to damaged containers.

Special containers can be an important part of a product distribution network and therefore, an important asset to a shipper. Many shippers, however, do not have an adequate system for tracking and maintaining their special containers. They may have procedures in place for repairing or replacing containers that are damaged but they do not maintain data related to the containers and related repairs or replacements and therefore, may not know how many containers they have in their network, the locations of containers in their network, the status of the containers, or the amount of resources (e.g., spare parts inventory) they devote to repair and replacement of containers. Without detailed information about the container management program that the shipper has deployed, it is nearly impossible for the shipper to control costs related to the program or even to determine what costs are attributable to the program.

There is a need for a system and method for managing returnable containers and repairs of returnable containers. In particular, there is a need for a system and method for managing repairs of special returnable containers that comprise multiple parts. There is a need for a system and method for managing data related to repairs performed on returnable containers as well as the spare parts that are used to repair the containers. There is a need for a computerized system and method for managing returnable containers and repairs that supports data collection as well as data analysis.

SUMMARY OF THE INVENTION

The present invention is a computerized system and method for managing a returnable container inventory and repairs of the returnable containers as well as their component parts. In particular, the computerized system and method of the present invention has features and functionality for tracking and managing repairs of special returnable containers that comprise multiple parts. The computerized system and method supports tracking of containers through a distribution network and management of data related to repairs performed on the returnable containers as well as the spare parts that are used to repair the containers. In addition, the computerized system and method allows for special handling of containers so that certain containers can be removed from the distribution network for a variety of reasons.

The present invention allows a shipper to record and analyze data related to many aspects of container inventory management and repair and therefore, evaluate the effectiveness of the repair system as well as determine possible opportunities for cost savings. Containers are identified according to a unique serial number. Handheld devices are used to scan container bar codes as well as to collect data related to repairs and spare parts used to complete the repairs. Data collected at the handheld devices is periodically transferred to a server computer where a returnable container management application executes. Various report features allow the shipper to determine the status of containers throughout the distribution network. In addition, the shipper can view data related to the container inventory as well as the inventory of spare parts used to repair the container. Finally, the shipper can manage the entire container inventory by using features in the system that allow the shipper to make suitable containers available for product shipments, to repair damaged containers and their component parts, and to remove from distribution those containers that are damaged beyond repair or otherwise require special handling.

BRIEF DESCRIPTION OF THE DRAWINGS

In addition to the novel features and advantages mentioned above, other objects and advantages of the present invention will be readily apparent from the following descriptions of the drawings and example embodiments.

FIG. 7 is a flow diagram illustrating details for container repair for an example embodiment of the present invention; and FIG. 8 is an example container inventory summary report for all container types for an example embodiment of the present invention.

DETAILED DESCRIPTION OF EXAMPLE EMBODIMENT(S)

In an example embodiment of the present invention, the returnable container management and repair system and method is used to manage returnable containers used to ship PRVs such as ATVs and PWCs. Four different types of returnable containers are supported (e.g., TA and TB for ATVs and PA and PB for PWCs) and each type of returnable container has a base, top, legs, and various accessories. The containers are used to ship assembled products to retailers and dealers for sale at their facilities. Although described in relation to containers for shipping assembled products, one of skill in the art would understand that the present invention could be used for management of containers for shipping and receiving many types of products and parts to and from many parties such as shippers, manufacturers, suppliers, dealers, etc. and for management of many other types of containers comprising many other types of parts or components.

Figure 1:
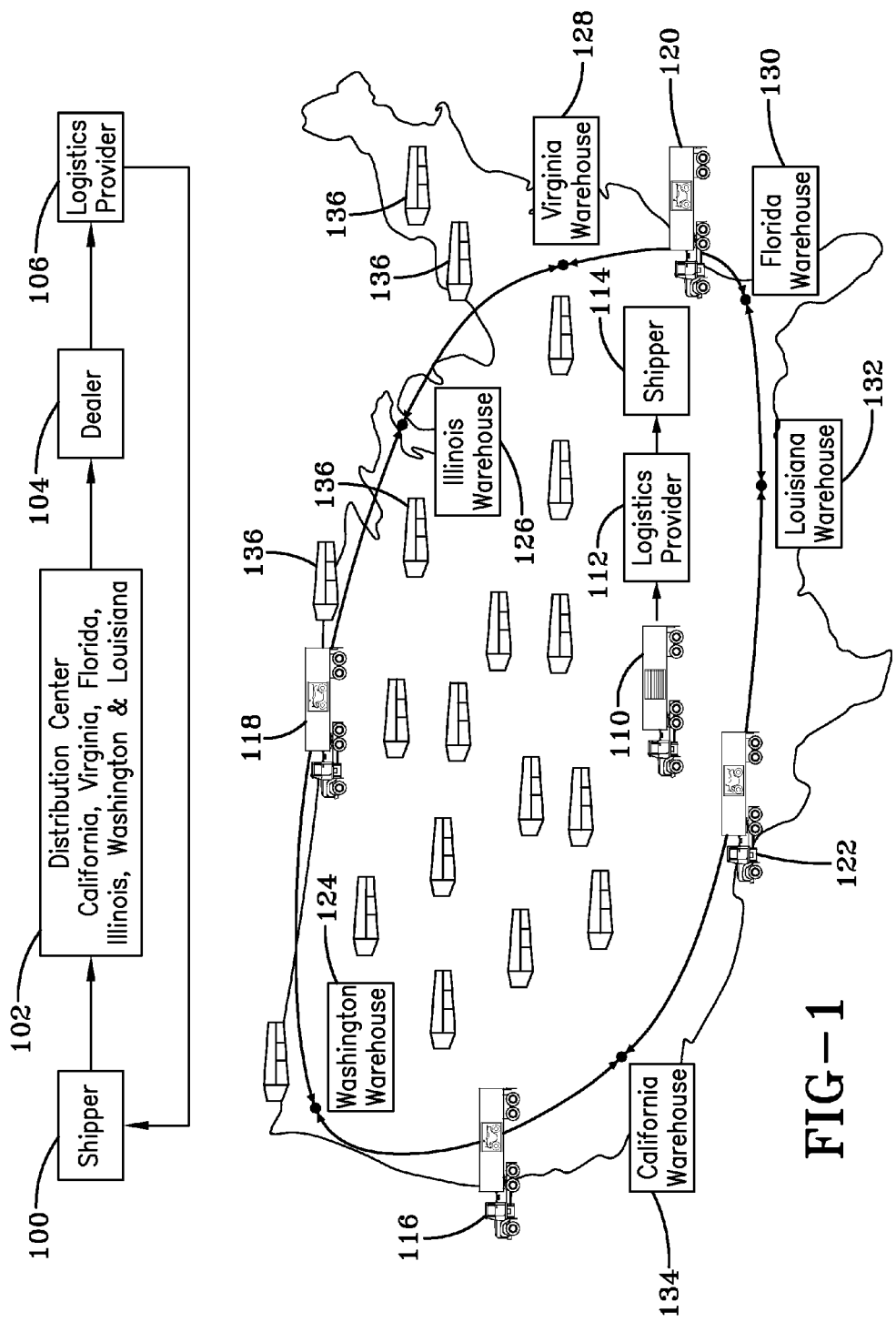
FIG. 1 is an illustration of a container distribution network for an example embodiment of the present invention.

Referring to FIG. 1, an illustration of a container distribution network is shown. A shipper 100 ships products such as PRVs in special containers to distribution centers 102 across the county. The products are then shipped in the containers from the distribution centers 102 to the dealers 104 where the products are removed from the containers. Empty containers are then shipped from the dealers 104 to a logistics provider 106 or to the distribution center 102 and then to the logistics provider 106. The logistics provider 106 operates the computerized system and method of the present invention to manage and repair the containers. The logistics provider then providers suitable containers to the shipper 100 so that additional products can be shipped to dealers 104.

As indicated in the example embodiment of FIG. 1, containers may be transported on tractor-trailers 110, 116, 118, 120, 122, around the country. Empty containers are transported by tractor-trailer 110 to a logistics provider 112 that inspects and repairs containers as needed and enters data related to the containers into the computerized management and repair system application. Suitable containers are then provided to the shipper 114 that then ships products in the containers to warehouses or distribution centers 124, 126, 128, 130, 132, 134. The products are then shipped from the distribution centers to dealers or retailers across the country 136. As FIG. 1 illustrates, because of the distances the containers travel and the amount of handling they endure, a certain amount of breakage, damage, or loss of parts is inevitable.

A computerized system and method for returnable container management and repair may be implemented using one or more computers and handheld devices that can be used to record data as various tasks are completed at the logistics provider's facility. Data regarding the containers is recorded and stored in one or more databases on a remote server. A software application at the server provides access to the container data and allows a user to enter data and generate reports related to the containers. A maintenance module allows a user to enter data for configuring the application and various parameters related to the container and repair data.

Figure 2:
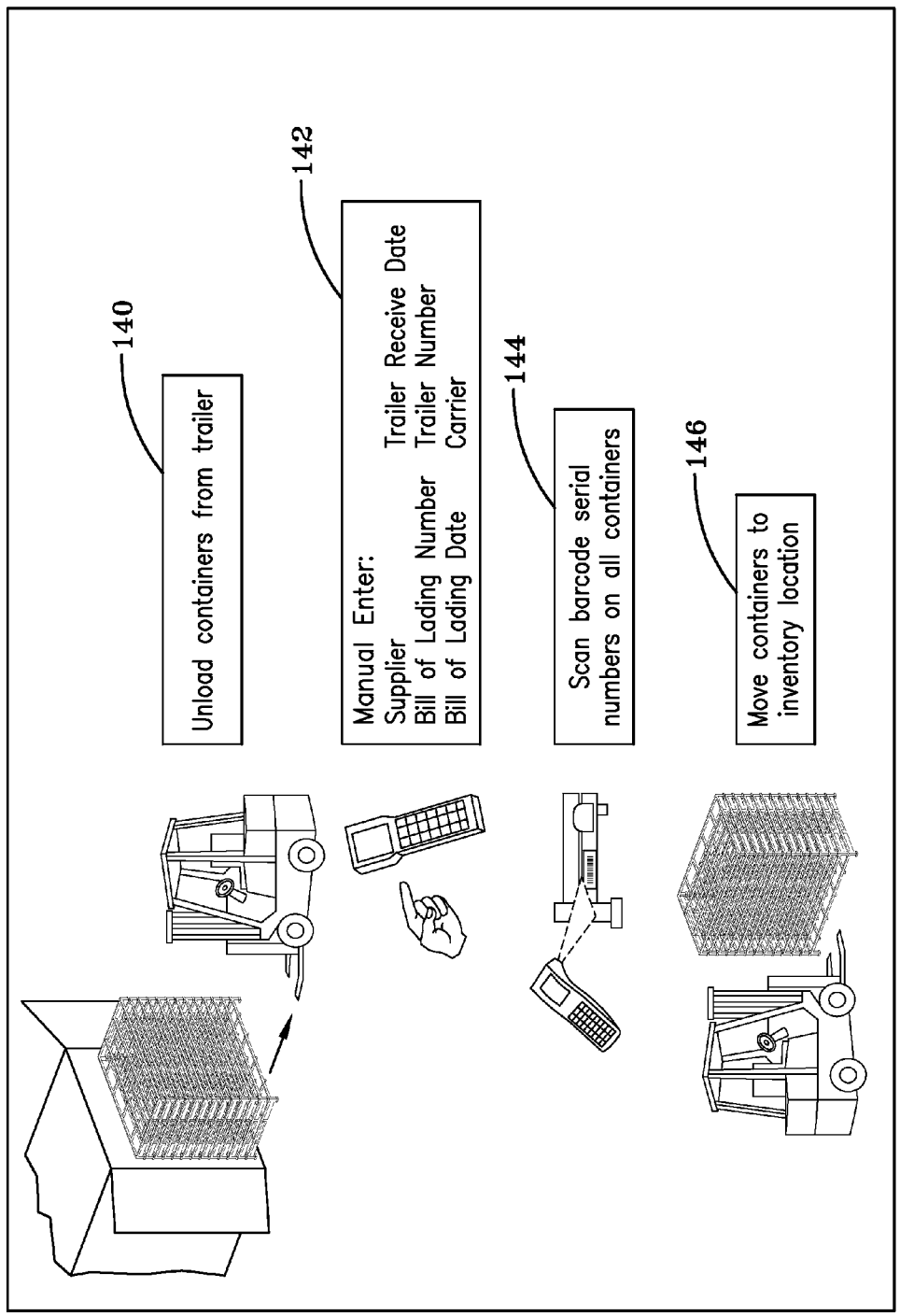
FIG. 2 is a flow diagram illustrating a process for receiving empty containers at a logistics provider for an example embodiment of the present invention.

Referring to FIG. 2, a flow diagram illustrating a process for receiving empty containers at a logistics provider is shown. Containers are unloaded from a tractor-trailer 140 upon arrival at the logistics provider's facility. The containers may be disassembled prior to shipment to the logistic provider's facility. The removable parts for each container may be held in the base or other suitable component of the container An associate at the logistics provider's facility enters in a handheld device information related to the supplier, applicable bill of lading for the container shipment, trailer, and carrier 142 for the container load received at the facility. Each container has a bar code label (e.g., affixed to a base or top component) with a serial number that uniquely identifies the container. The bar code for each container in the load is scanned 144. The containers are then moved to an inventory location for further processing 146. Once the receiving process is completed, the containers are added to a "waiting to be sorted" inventory.

Figure 3:
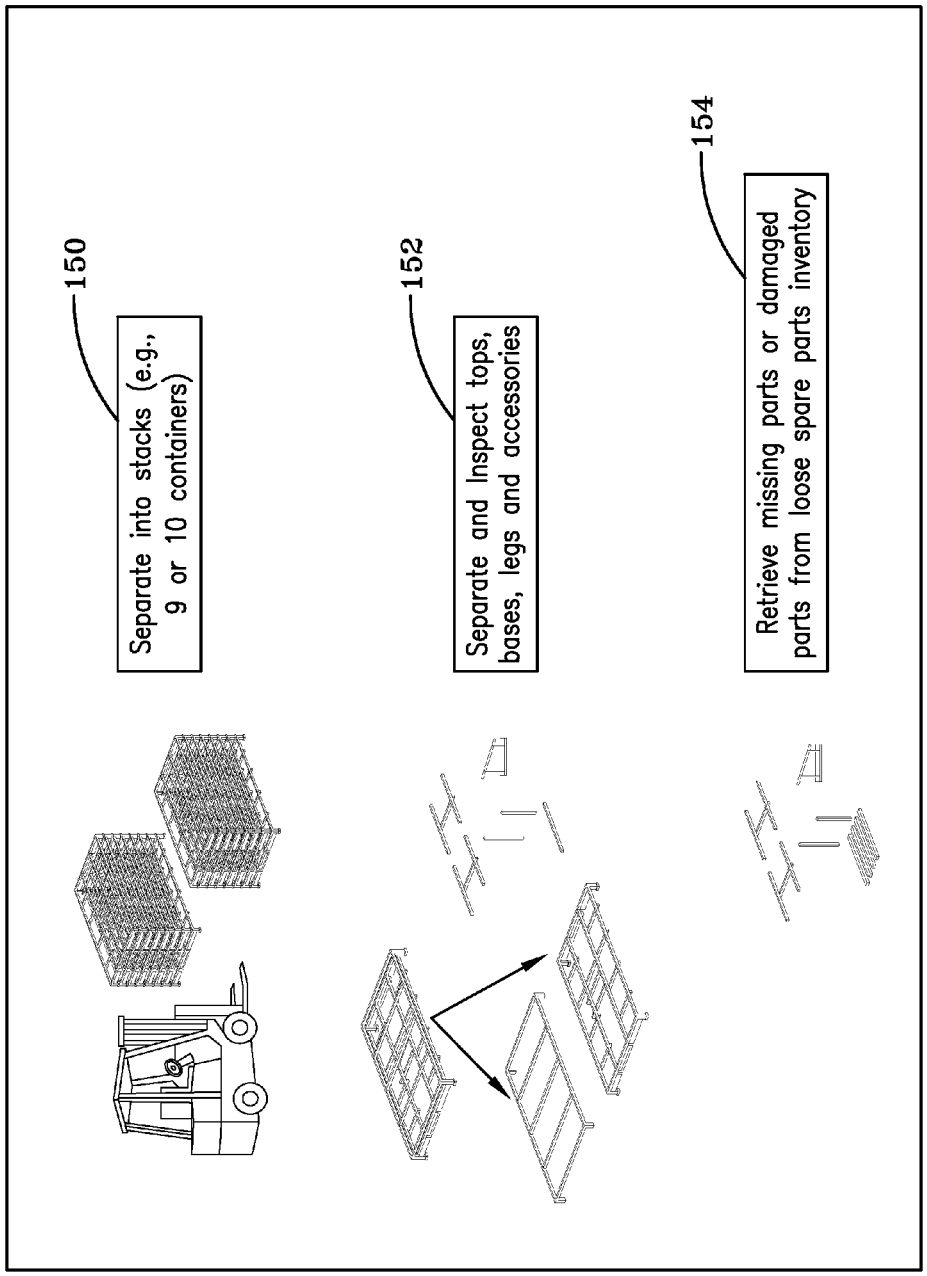
FIG. 3 is a flow diagram illustrating a process for sorting containers for an example embodiment of the present invention.

Referring to FIG. 3, a flow diagram illustrating a process for sorting containers is shown. Containers are separated into stacks 150 for further processing. An associate then separates and inspects the components for each container to assess breakage or damage. If the associate determines that certain parts are missing or damaged, the associate retrieves the missing or damaged parts from a spare parts inventory and places them in the container 154.

Figure 4:
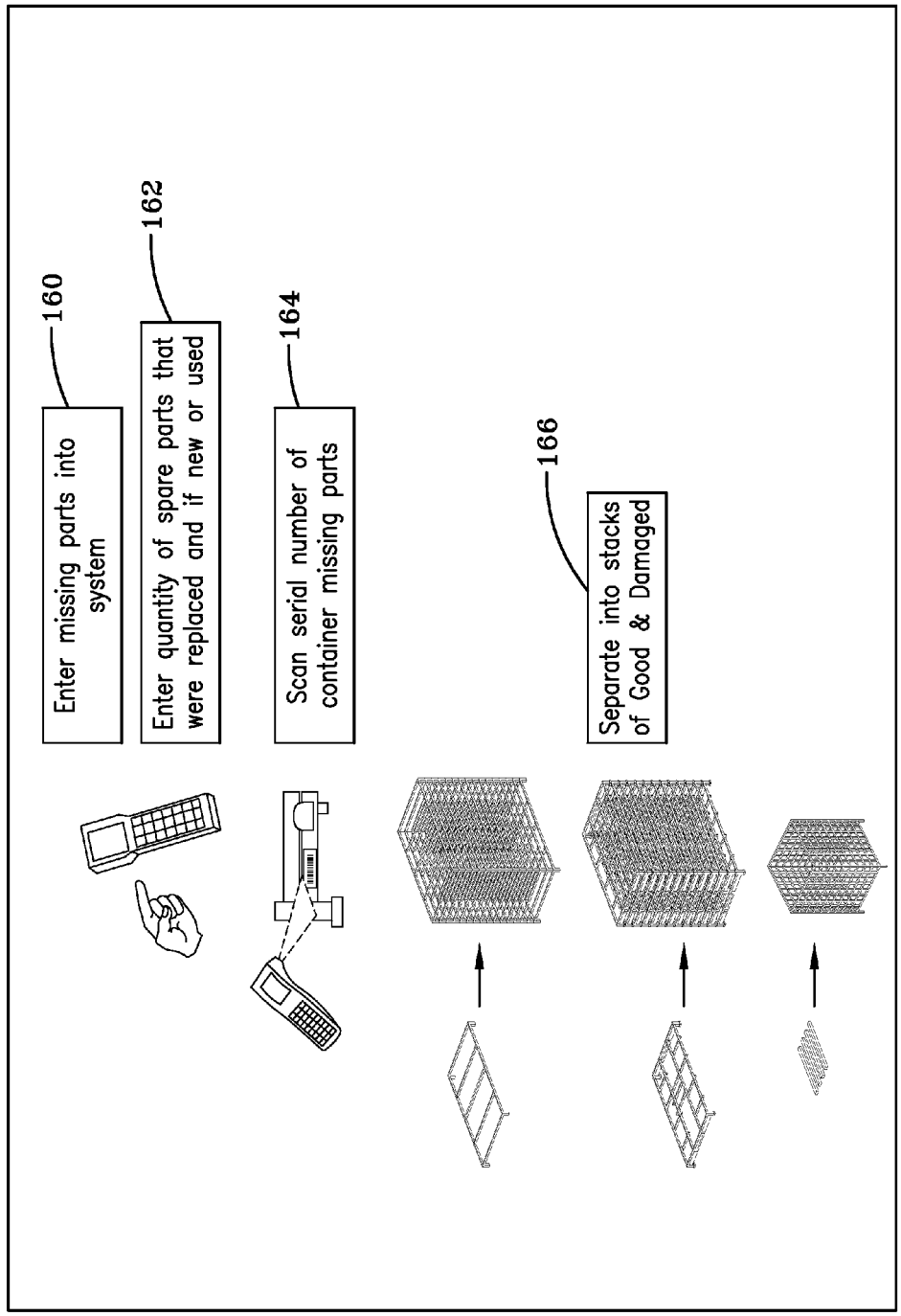
FIG. 4 is a flow diagram illustrating additional details related to the sorting process for an example embodiment of the present invention.

Referring to FIG. 4, a flow diagram illustrating additional details related to the sorting process is shown. An associate enters missing parts data into the handheld device 160 and indicates the quantity of parts that were replaced and whether they were new or used 162. The associate then scans the serial numbers of the containers with the missing parts 164. The containers are then separated into stacks of undamaged or damaged containers 166.

Figure 5:
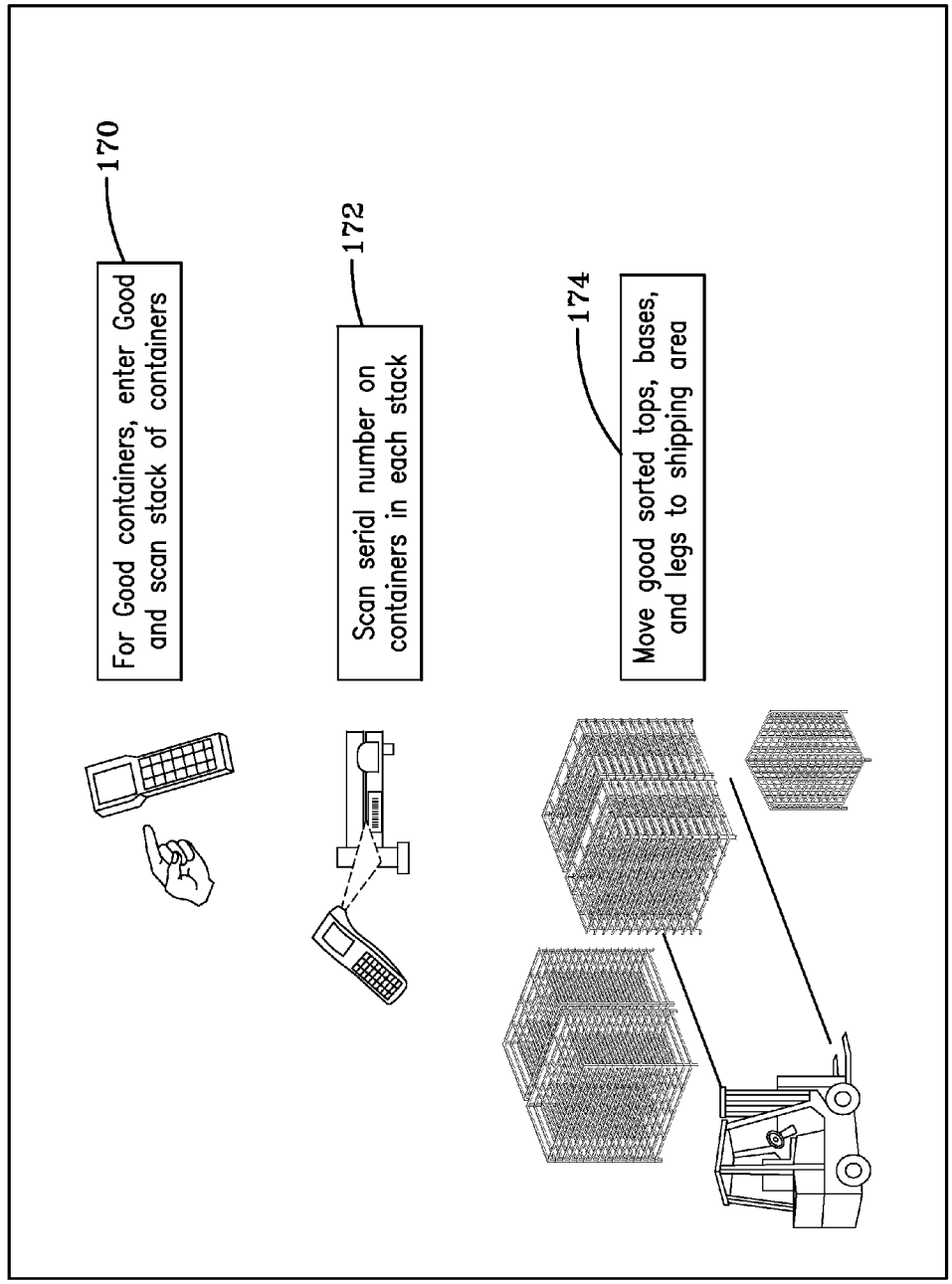
FIG. 5 is a flow diagram illustrating details related to processing undamaged containers for an example embodiment of the present invention.

Referring to FIG. 5, a flow diagram illustrating details related to processing undamaged containers is shown. An associate enters an "undamaged" or "good" status indicator 170 into the handheld device and scans the serial number of each container in the undamaged stack 172. The undamaged, sorted bases, tops, legs, and other parts are then moved to a shipping area 174. Once the scanning process for undamaged containers is completed, the containers are added to an "available" inventory.

Figure 6:
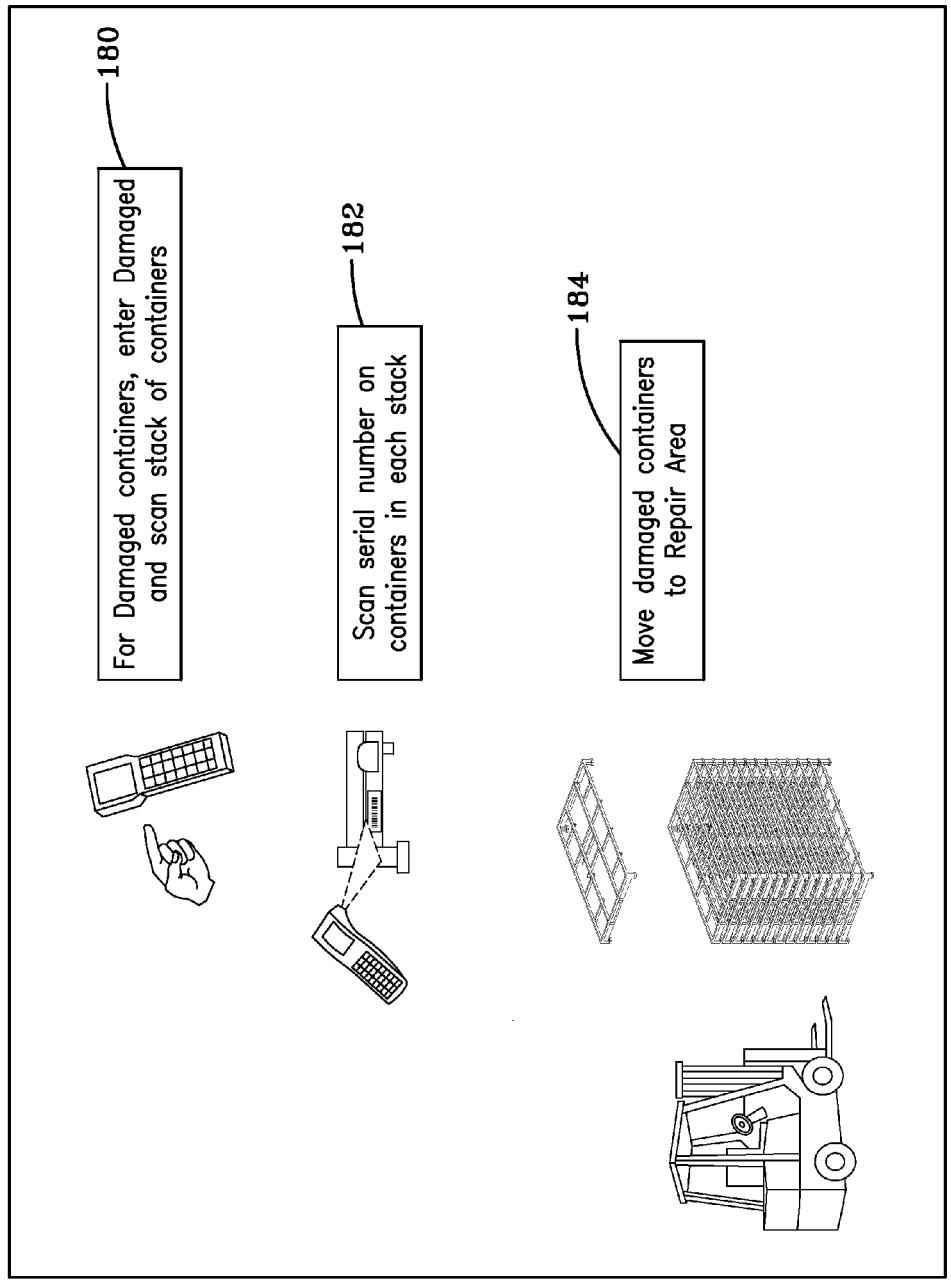
FIG. 6 is a flow diagram illustrating details related to processing damaged containers for an example embodiment of the present invention.

Referring to FIG. 6, a flow diagram illustrating details related to processing damaged containers is shown. An associate enters a "damaged" status indicator into the handheld device 180 and scans the serial number of each container in the damaged stack 182. The damaged containers are then moved to a repair area 184 in the facility. Once the scanning process for damaged containers is completed, the containers are added to a "repairable" inventory.

Referring to FIG. 7, a flow diagram illustrating details for container repair is shown. Each container in the damaged container area 190 is repaired as needed. Using the handheld device, an associate enters a "repaired" status indicator 192 and scans the serial number of each container that has been repaired 194. In addition, the associate scrolls through a parts list and enters a quantity for each part used to complete the repair 196. The repaired containers are then moved to a shipping area 198. Once the repair process is completed, the containers are added to the "available" inventory. In addition, the parts that are used to repair the containers are subtracted from the spare parts inventory so that additional parts can be ordered as needed.

Appendix A shows a system main menu for a returnable container management and repair (RCMR) software application according to an example embodiment. As shown in Appendix A, the main menu has a number of options that relate to application subsystems for tracking containers including receiving, sorting, repairing, shipping containers, and scrapping containers. Data regarding containers is collected in association with each of these processes and transferred to one or more databases. Data is typically collected using handheld devices. Certain options of the RCMR application are supported on the handheld device (e.g., receiving, sorting, and repairing).

Another option on the RCMR application main menu allows a computer user to access a subsystem for generating reports. The reports typically provide status information related to containers in inventory. The information may be tracked within the RCMR application by associating status or condition indicators with each container serial number or by maintaining lists or inventories of containers for each of the different status/condition indicators (e.g., "waiting for sorting" for containers with an unknown condition, "available" for containers that are in good condition, "damaged" for containers that need to be repaired, "waiting to be scrapped" for containers with unrepairable damage, "shipped" for containers ready to be loaded). Status or condition indicators may be maintained independently of inventories (e.g., containers in the "available" inventory may have status indicators of "good" or "repaired"). In addition, the reports may provide information about the replacement or repaired parts used to repair containers. An inquiry option allows a user to access a subsystem for reviewing information about the status of containers and to review inventory data for containers including parts data and to arrange for special handling of containers. A maintenance subsystem allows a user to configure the application and change parameters used in other parts of the application.

The receive subsystem of the RCMR application supports the entry of data related to the receipt of containers at a logistics provider's facility. Data may be entered using a handheld device. Shipments of containers arrive on tractor-trailers and are unloaded at the facility. The RCMR application allows a user to select a supplier from a list of suppliers. The supplier is identified on the bill of lading for the container shipment. Each container is then scanned as it is unloaded from the tractor-trailer to indicate it was received from the specified supplier.

The sort subsystem of the RCMR application supports the process of sorting containers into "good" and "damaged" categories and entry of missing parts data. In addition, the sort function provides status information in response to the entry of a container serial number.

The repair subsystem of the RCMR application supports the repair process and allows a user to scan serial numbers of containers that are repaired. A similar shipping function allows a user to scan serial numbers of containers to be shipped. A scrap function allows a user to scan serial numbers of containers that cannot be repaired.

The inquiry subsystem supports various options for reviewing status data related to containers. For example, an "Asset Exceptions" option allows a user to view status data related to one or more containers (assets) identified by serial number. Containers removed from service may be labeled as "inactive" while containers to be removed from service may be labeled as "waiting to be scrapped." Other containers may be placed on "hold" indicating they are temporarily out of circulation. The exception data may be communicated through the handheld devices to associates at the logistics provider. When an associate scans a serial number of a container that has an exception or flag for special handling, the associate can complete the tasks or activities related to the special handling such as moving the container to a special projects area for further processing and adding the container to a "special projects" inventory.

Referring to Table 1, results from an "Asset Exceptions" option is shown.

TABLE 1

Asset Exceptions

| Option Change/Delete | Asset Code | Reason Code | Reason Description | Date Added |
|---|---|---|---|---|
| | PA000002 | 04 | Inactive | May 6, 2008 |
| | PA000035 | 03 | Waiting to Be Scrapped | May 6, 2008 |
| | PA000042 | 03 | Waiting to Be Scrapped | May 6, 2008 |
| | PA000049 | 04 | Inactive | May 6, 2008 |
| | PA000088 | 04 | Inactive | May 6, 2008 |
| | PA000104 | 04 | Inactive | May 6, 2008 |
| | PA000109 | 04 | Inactive | May 6, 2008 |
| | PA000114 | 01 | Hold | May 6, 2008 |
| | PA000129 | 04 | Inactive | May 6, 2008 |
| | PA000132 | 01 | Hold | May 6, 2008 |

The inquiry subsystem also supports an "Asset Number/Bill of Lading" option as shown in Table 2. With this option, a user can view data regarding assets identified by serial number and warehouse, receive date, applicable receive bill of lading and receiving trailer (Receive BOL; Receiving Trailer), and warehouse location (e.g., sort or shipped area). Related asset number and bill of lading options allow a user to enter an asset number or bill of lading number to view details on a specific container. Additional details may include shipping dates, in what state a container is located, etc.

TABLE 2

Asset Number/Bill of Lading Inquiry

| Options Change/ Delete | Type | Asset | Ware house | Receive Date | Receive BOL | Receiving Trailer | Warehouse Location |
|---|---|---|---|---|---|---|---|
| | PA | PA000003 | 01 | Oct. 2, 2007 | 27000 | 7489 | Sort |
| | PA | PA000004 | 01 | Sep. 26, 2007 | 26972 | 8445 | Sort |
| | PA | PA000005 | 01 | Sep. 10, 2007 | 29563 | 0605 | Shipped |
| | PA | PA000006 | 01 | Oct. 2, 2007 | 27000 | 2948 | Sort |
| | PA | PA000014 | 01 | Sep. 28, 2007 | 26985 | 8445 | Sort |
| | PA | PA000015 | 01 | Sep. 7, 2007 | 29559 | 2072 | Sort |
| | PA | PA000023 | 01 | Sep. 27, 2007 | 26969 | 2823 | Shipped |
| | PA | PA000026 | 30 | Oct. 6, 2008 | 81640457 | 12157 | Sort |
| | PB | PA000028 | 40 | Oct. 9, 2008 | 81642766 | 688753 | Sort |
| | PB | PA000031 | 01 | Sep. 28, 2007 | 26983 | 2805 | Sort |

An "Asset Number Advance Shipment Notice" option allows a user to view data regarding containers in transit to the logistic provider's facility. As shown in Table 3, the inquiry indicates when an advance shipment notice for a shipment of containers is issued. It further identifies the trailer with the shipment so that the shipment of containers can be tracked.

TABLE 3

Asset Number/Advance Shipment Notice Inquiry

| Options Change/ Delete | Type | Asset | Ware-house | Receive BOL | Advance Shipment Notice | Ship Date | Shipping Trailer |
|---|---|---|---|---|---|---|---|
| | PA | PA000003 | 01 | 27000 | | 00/00/0000 | |
| | PA | PA000004 | 01 | 26972 | | 00/00/0000 | |
| | PA | PA000005 | 01 | 29563 | 1599 | Mar. 19, 2008 | 8351 |
| | PA | PA000006 | 01 | 27000 | | 00/00/0000 | |
| | PA | PA000014 | 01 | 26985 | | 00/00/0000 | |
| | PA | PA000015 | 01 | 29559 | | 00/00/0000 | |
| | PA | PA000023 | 01 | 26969 | 1130 | Sep. 27, 2007 | 60669 |
| | PA | PA000026 | 30 | 81640457 | | 00/00/0000 | |
| | PB | PA000028 | 40 | 81642766 | | 00/00/0000 | |
| | PB | PA000031 | 01 | 26983 | | 00/00/0000 | |

The reports subsystem supports generation of reports providing status information about the container inventory, repairs, and spare parts that are used to repair containers. Several reports provide a computer user with an overview of the container inventory while other reports provide more specific details related to an aspect of container management and repair according to the present invention.

Table 4 is a target day's supply report for a specified container type (TA). Shipper's often set "a target day's supply" value for various supplies they require based on the number of days required to receive the specified item from a supplier. If it takes 60 days to receive a shipment of containers from a supplier, the target day's supply value may be set to 60 days. The target day's supply report may indicate how many days worth of container components are on-hand at the logistic provider's facility as well as additional details related to container inventory and planned production volumes. The data reflected in daily reports may alert associates to potential problems. As shown in Table 4A for container type TA, the day's supply of bases (57), tops (58), and legs (58) may be slightly lower than the target day's supply of 60. Also shown in Table 4A is the daily planned production for the container type (279).

TABLE 4A

TA Report

| TA Report | Bases | Tops | Legs |
|---|---|---|---|
| Number of Day's Supply based upon Daily Production | 57 | 58 | 58 |
| Target Day's Supply | | 60 | |
| Daily Production for TA | | 279 | |

Another section of the report as shown in Table 4B may provide additional details regarding the current inventory of containers for the specified type. First, the spare parts inventory (216) and on-hand bases inventory (200) is shown. In addition, the total inventory, waiting to be sorted inventory, and damaged repairable inventory for bases, tops, and legs of containers may be shown. Inventory in the "special projects" category as well as a complete loose spare parts (surplus and new/used) inventory may be shown. Finally, the total on-hand inventory for all container components may be shown (Total Available Inventory+Total Waiting to be Sorted+Total Damaged Repairable+Special Project).

TABLE 4B

Reports - TA Deviation On-Hand

| TA Deviation On-Hand Spare Parts v. On-Hand Bases | | 216 | 200 |
|---|---|---|---|
| As of Today | Apr. 3, 2008 | Bases | Tops | Legs |

| | Bases | Tops | Legs |
|---|---|---|---|
| Total Available Inventory | 289 | 400 | 1156 |
| Total Waiting to Be Sorted Inventory | 15356 | 15356 | 61424 |
| Total Damaged Repairable Inventory | 200 | 200 | 800 |
| Special Project | 0 | 0 | 0 |
| Loose Spare Parts (Surplus) (New & Used) | 0 | 150 | 800 |
| Total On-Hand Inventory | 15845 | 16106 | 64180 |

A third section of the report may provide repair details indicating the number of containers damaged beyond repair and the number repaired for a specified time period as illustrated in Table 4C.

TABLE 4C

Reports - TA Repair Report

| TA Damaged Beyond Repair | TA Repaired Month to Date |
|---|---|
| 15 | 5 |

In addition to providing summary information, the reports subsystem may be used to obtain detailed repair or status information. For example, for containers that have been identified as "repairable," a detailed report for a specified container type as shown in Table 5A identifies the quantity undergoing repair as well as the number that have been repaired.

TABLE 5A

Reports - Repair Target TB-Range for 12,300 Containers

| No. | TB Range | | Quantity | Quantity Complete | Percent complete |
|---|---|---|---|---|---|
| 1 | TB | 000001-TB 01000 | 1,000 | 961 | 96.1% |
| 2 | TB | 001201-TB 01800 | 600 | 593 | 98.8% |
| 3 | TB | 002201-TB 02500 | 300 | 288 | 96.0% |
| 4 | TB | 010001-TB 12400 | 2,400 | 2,354 | 98.1% |
| 5 | TB | 012801-TB 14000 | 1,200 | 1,163 | 96.9% |
| 6 | TB | 014401-TB 15000 | 600 | 580 | 96.7% |
| 7 | TB | 016401-TB 16600 | 200 | 195 | 97.5% |
| 8 | TB | 045401-TB 45800 | 400 | 359 | 89.8% |
| 9 | TB | 048001-TB 48300 | 300 | 267 | 89.0% |
| 10 | TB | 049701-TB 50000 | 300 | 290 | 96.7% |
| 11 | TB | 051501-TB 52000 | 500 | 479 | 95.8% |
| 12 | TB | 052801-TB 57300 | 4,500 | 4,328 | 96.2% |
| | S-TOTAL | | 12,300 | 11,857 | 96.4% |

A similar report as shown in Table 5B provides details for exception or special handling of containers selected previously for special handling.

TABLE 5B

Reports - Inspection Target TB-Range for 68,481 Containers

| No. | TB Range | | Quantity | Quantity complete | Percent complete |
|---|---|---|---|---|---|
| 1 | TB | 001001-TB 001200 | 200 | 200 | 100.0% |
| 2 | TB | 001801-TB 002200 | 400 | 392 | 98.0% |
| 3 | TB | 002501-TB 010000 | 7,500 | 7,391 | 98.5% |
| 4 | TB | 012401-TB 012800 | 400 | 396 | 99.0% |
| 5 | TB | 014001-TB 014400 | 400 | 395 | 98.8% |
| 6 | TB | 015001-TB 016400 | 1,400 | 1,386 | 99.0% |
| 7 | TB | 016601-TB 045400 | 28,800 | 28,257 | 98.1% |
| 8 | TB | 045801-TB 048000 | 2,200 | 2,162 | 98.3% |
| 9 | TB | 048301-TB 049700 | 1,400 | 1,349 | 96.4% |
| 10 | TB | 050001-TB 051500 | 1,500 | 1,437 | 95.8% |
| 11 | TB | 052001-TB 052800 | 800 | 770 | 96.3% |
| 12 | TB | 057301-TB 069920 | 12,620 | 12,097 | 95.9% |
| 13 | TB | 070001-TB 080000 | 10,000 | 9,598 | 96.0% |
| 14 | TB | 090001-TB 090861 | 861 | 772 | 89.7% |
| | S-TOTAL | | 68,481 | 66,602 | 97.3% |

Referring to FIG. 8, an example container inventory summary report for all container types is shown. The report may be organized according to months and container type 200, 202, 204, 206 and show details for each container type as well as totals for all containers 208. For each month, the report may show the total number of containers received at the logistics provider's facility as well as the number of undamaged containers shipped to the shipper, the end-of-month balance, the number of damaged containers received, and the number repaired. The container data including the details related to the damaged and repaired containers as well as their component parts allows the logistics provider or shipper to monitor the level of damage occurring to the containers as well as the repair performance. Because the system tracks container as well as component repairs, information can also be provided to the manufacturer of the containers. For example, if the logistics provider determines that a large number of repairs to a component such as a tire pan have been required, then the container manufacturer may want to make design changes on future crates or containers to address the repair problem.

The maintenance subsystem allows a computer user to modify various parameters used throughout the RCMR application. For example, a user can modify the daily production and target days supply parameters that are used in various reports and inquiry functions. As shown in Table 6, the user can enter a daily production and target days supply parameter for each container type. The date on which the values were changed is also noted.

TABLE 6

Maintenance - Daily Production /Target Days Supply

| Options Change/Delete | Type | Daily Production | Target Days Supply | Date Changed | Status |
|---|---|---|---|---|---|
| | PA | 18 | 60 | May 27, 2008 | |
| | PB | 12 | 60 | May 21, 2008 | |
| | TA | 279 | 60 | May 16, 2008 | |
| | TB | 529 | 60 | May 16, 2008 | |

The maintenance subsystem also supports spare parts inventory management. When parts or components for assembling and repairing containers are ordered and received from suppliers, the applicable container type, part code and description, quantity received, date received, and new/used indicator is entered and the spare parts inventory is updated. Table 7 is an example spare parts view.

TABLE 7

Maintenance - Spare Parts

| Options Change/ Delete | Type | Part Code | Part Description | Quantity Received | Date Received | New/ Used | Status |
|---|---|---|---|---|---|---|---|
| | PA | 00 | | 500 | May 10, 2008 | N | A |
| | PA | 30 | Tops | 500 | May 10, 2008 | N | A |
| | PA | 39 | H Brackets | 200 | May 10, 2008 | N | A |
| | PA | 40 | Short Chock (Hull Support) | 250 | May 10, 2008 | N | |
| | PA | 41 | Side Posts | 200 | May 10, 2008 | N | A |
| | PA | 42 | Ride Plate | 200 | May 10, 2008 | N | A |
| | PA | 43 | A Brackets | 200 | May 10, 2008 | N | A |
| | PA | 44 | Split Chock | 600 | May 10, 2008 | N | A |
| | PB | 00 | | 200 | May 10, 2008 | N | A |
| | PB | 02 | Tops | 200 | May 10, 2008 | N | A |

Another feature of the maintenance subsystem also supports spare parts inventory management. When parts or components for assembling and repairing containers are ordered and received from suppliers, the applicable container type, part code and description, quantity received, date received, and new/used indicator is entered. The spare parts inventory is then updated with the data entered into the system.

The maintenance subsystem further supports "exceptions" or "special handling" of containers. The logistics provider or shipper may want to remove containers from circulation for a variety of reasons. For example, if the logistics provider or shipper identifies a safety issue associated with containers from a particular supplier, it may want to isolate those containers for inspection. In other instances, the logistics provider or shipper may want to remove older containers from circulation and replace them with new ones. There may be a number of reasons that containers need to be flagged for special handling so the RCMR allows a computer user to identify the containers to be flagged. The user identifies an asset serial number or code or range of numbers subject to an exception. In addition, a reason code and description are entered. The entry date is also noted. When an associate scans a container that has been flagged for special handling, the associate follows the special handling procedure. The container may be moved to a special area for further handling or additional instructions for handling the container may be provided. As Table 8 indicates, to flag a container for special handling, a user identifies a container according to its code or serial number and enters a reason code for the special handling. A description and entry date may be added automatically to the entry.

TABLE 8

Maintenance - Asset Exceptions

| Option Change/Delete | Asset Code | Reason Code | Reason Description | Date Added |
|---|---|---|---|---|
| | PA000002 | 04 | Inactive | May 6, 2008 |
| | PA000035 | 03 | Waiting to Be Scrapped | May 6, 2008 |
| | PA000042 | 03 | Waiting to Be Scrapped | May 6, 2008 |
| | PA000049 | 04 | Inactive | May 6, 2008 |
| | PA000088 | 04 | Inactive | May 6, 2008 |
| | PA000104 | 04 | Inactive | May 6, 2008 |
| | PA000109 | 04 | Inactive | May 6, 2008 |
| | PA000114 | 01 | Hold | May 6, 2008 |
| | PA000129 | 04 | Inactive | May 6, 2008 |
| | PA000132 | 01 | Hold | May 6, 2008 |

Maintenance of asset exceptions also includes the ability to enter and modify reason codes. Example reason codes are shown in Table 9.

TABLE 9

Maintenance - Asset Exception Reason Codes

| Options Change/Delete | Type | Reason Code Description | Date Changed | Status |
|---|---|---|---|---|
| | 1 | Hold | May 21, 2008 | A |
| | 2 | Supplier Requested | May 21, 2008 | A |
| | 3 | Waiting to Be Scrapped | May 21, 2008 | A |
| | 4 | Inactive | May 21, 2008 | A |
| | 5 | Adjusted | May 27, 2008 | A |

The RCMR application of the present invention provides features and functionality for managing an important component of a shipper's product distribution network—the returnable container. The RCMR application supports data entry and tracking related to containers as well as the spare parts used to repair the containers to keep them in service. The ability to collect and analyze data related to returnable containers, their status and locations, and related repairs provides a shipper with valuable information regarding its returnable container program.

An exemplary embodiment of a computerized returnable container management and repair system and method has been shown and described above. It should be realized by one skilled in the art that various modifications may be made to features and functionality of the RCMR application described above as well as types of containers supported by the system and method. Therefore, while certain embodiments of the present invention are described in detail above, the scope of the invention is not to be considered limited by such disclosure, and modifications are possible without departing from the spirit of the invention as evidenced by the following claims:

APPENDIX A

System Main Menu

1. Receiving
   A. Bill of Lading Supplier (Select Supplier on BOL)
      i. Supplier A
      ii. Supplier B
      iii. Supplier C
      iv. Supplier D
      v. Supplier E
   B. Enter Bill of Lading Number (BOL #)
2. Sort
   Category (1=Good; 2=Damaged; 3=Missing Part; 4=Locate Asset)

3. Repair
   Category (1=Testing; 2=Repair)
4. Shipping
   Scan RCC Tag (Trailer #_____)
5. Scrap Container
   Scan RCC Tag (Asset Tag Label _____)
6. Reports
   A. Summary Report A
   B. Summary Report B
   C. Detail Reports
   D. Reprint BOL/MPL
   E. Print Month End Billing
   F. Print Replacement Parts Report
   G. Print Detail for Day
   H. Print Summary by Range
7. Inquiries
   A. Asset Serial Number/Bill of Lading Inquiry
   B. Asset/Advance Shipment Notice Inquiry
   C. Bill of Lading Query
   D. Sort Query
8. Label Print
9. Add Trailer
10. Maintenance
    A. Daily Production/Target Days Supply
    B. Spare Parts
    C. Asset Exception/Potential Scrap
    D. Exception Reason Code Maintenance

What is claimed is:

1. A computerized method for managing returnable container repairs comprising:
   (a) storing in a container database unique identifiers for a plurality of containers;
   (b) storing in a repair parts database inventory data for parts used to repair said containers when said containers are damaged;
   (c) receiving at a computer in a facility upon arrival of said plurality of containers at said facility said unique identifiers for said containers;
   (d) adding to a damaged inventory database in said computer unique identifiers for containers that arrived damaged;
   (e) receiving at said computer for containers in said damaged inventory database identifying data for repair parts needed to repair said containers that are damaged;
   (f) updating said repair parts inventory data in said repair parts database when repair parts are used to repair said containers that are damaged; and
   (g) generating at said computer a report comprising for each container in said damaged inventory database of containers:
      (1) said unique identifier for said container;
      (2) parts needed to repair said container; and
      (3) a repair status.

2. The method of claim 1 wherein each of said unique identifiers for said plurality of containers is in a bar code label affixed to said container.

3. The method of claim 2 wherein storing in a container database unique identifiers for a plurality of containers comprises receiving at said computer data from said bar code label affixed to said container.

4. The method of claim 2 wherein adding to a damaged inventory database in said computer unique identifiers for containers that arrived damaged at said facility comprises scanning bar codes of damaged containers.

5. The method of claim 1 wherein said returnable containers are used for transporting personal recreation vehicles.

6. The method of claim 5 wherein said personal recreation vehicles are selected from the group consisting of all-terrain vehicles and personal watercraft.

7. A computerized method for managing returnable containers comprising:
   (a) storing in a container database unique identifiers for a plurality of containers;
   (b) receiving at a facility a plurality of containers with said unique identifiers and for each container, executing at a computer the following steps;
      (i) receiving at said computer a unique identifier for said container;
      (ii) receiving at said computer a request to add said unique identifier for said container to an available inventory in said computer if said container is undamaged;
      (iii) receiving at said computer a request to add said unique identifier for said container to a damaged inventory in said computer if said container is damaged;
      (iv) receiving at said computer a request to add said unique identifier for said container to a special handling inventory in said computer if said container has a special handling indicator; and
   (c) generating at said computer a report comprising container status data for each of said containers in:
      (i) said available inventory;
      (ii) said damaged inventory; and
      (iii) said special handing inventory.

8. The method of claim 7 wherein each of said unique identifiers for said plurality of containers is in a bar code label affixed to said container.

9. The method of claim 8 wherein (b)(i) receiving at a computer a unique identifier for said container comprises receiving at said computer data from said bar code label affixed to said container.

10. The method of claim 8 wherein receiving at said computer a request to add said unique identifier for said container to an available inventory in said computer if said container is undamaged comprises receiving at said computer data for a bar code of an undamaged container.

11. The method of claim 8 wherein receiving at said computer a request to add said unique identifier for said container to a damaged inventory in said computer if said container is damaged comprises receiving at said computer data for a bar code of a damaged container.

12. The method of claim 8 wherein receiving at said computer a request to add said unique identifier for said container to a special handling inventory in said computer if said container has a special handling indicator comprises receiving at said computer data for a bar code of a container with a special handling indicator.

13. The method of claim 7 wherein generating a report comprising container status data for said available inventory, said damaged inventory, and said special handing inventory comprises generating a report with a total number of containers in each of said available inventory, said damaged inventory, and said special handling inventory.

14. The method of claim 7 further comprising:
    (d) identifying in said computer for containers in said damaged inventory repair parts needed to repair said containers that are damaged;
    (e) updating a repair parts inventory in said computer when repair parts are used to repair said containers in said damaged inventory; and
    (f) updating said available inventory in said computer with unique identifiers for containers from said damaged inventory that have been repaired.

15. The method of claim 7 wherein said returnable containers are used to transport personal recreational vehicles.

16. A computerized method for managing returnable container repairs comprising:

(a) storing in a container database unique identifiers for a plurality of containers;
(b) storing in a repair parts database inventory data for parts used to repair said containers when said containers are damaged;
(c) receiving at a computer in a facility upon arrival of said plurality of containers at said facility said unique identifiers for said containers;
(d) adding to an available inventory database in said computer unique identifiers for containers that are undamaged;
(e) adding to a damaged inventory database in said computer unique identifiers for containers that are damaged;
(f) identifying in said computer for containers in said damaged inventory database repair parts needed to repair said containers that are damaged;
(g) updating said repair parts inventory data in said repair carts database when repair parts are used to repair said containers with said unique identifiers;
(h) updating said available inventory database in said computer with unique identifiers for containers from said damaged inventory database that have been repaired; and
(i) generating a report comprising status data for said containers in:
(1) said available inventory database; and
(2) said damaged inventory database.

17. The method of claim 16 wherein each of said unique identifiers for said plurality of containers is in a bar code label affixed to said container.

18. The method of claim 17 wherein receiving at a computer unique identifiers for a plurality of containers comprises receiving at said computer data from said bar code label affixed to said container.

19. The method of claim 17 wherein adding to an available inventory database in said computer unique identifiers for containers that are undamaged comprises scanning bar codes of undamaged containers.

20. The method of claim 17 wherein adding to a damaged inventory database in said computer unique identifiers for containers that are damaged comprises scanning bar codes of damaged containers.

\* \* \* \* \*